United States Patent [19]

Ulitsky et al.

[11] Patent Number: 5,039,323

[45] Date of Patent: Aug. 13, 1991

[54] AIR CLEANER

[76] Inventors: Alexandr D. Ulitsky, ulitsa Gorkogo, 129.kv.64; Jury I. Glushkov, ulitsa Asatkina,16,kv.2; Vladimir V. Andreev, Suzdalsky prospekt,35,kv.88 all of, Vladimir, U.S.S.R.

[21] Appl. No.: 623,885

[22] PCT Filed: May 30, 1989

[86] PCT No.: PCT/SU89/00148

§ 371 Date: Dec. 26, 1990

§ 102(e) Date: Dec. 26, 1990

[87] PCT Pub. No.: WO90/15239

PCT Pub. Date: Dec. 13, 1990

[51] Int. Cl.[5] .......... B01D 46/00

[52] U.S. Cl. .......... 55/320; 55/323; 55/487; 55/489; 55/527

[58] Field of Search .......... 55/318–323, 55/462, 463, 486–489, 527, 528

[56] References Cited

U.S. PATENT DOCUMENTS

| | | | |
|---|---|---|---|
| 3,791,105 | 2/1974 | Rhodes | 55/322 X |
| 3,923,480 | 12/1975 | Visch | 55/321 X |
| 4,673,423 | 6/1987 | Yumlu | 55/319 |

*Primary Examiner*—Charles Hart

*Attorney, Agent, or Firm*—Burgess, Ryan & Wayne

[57] ABSTRACT

The present invention relates to engine manufacture. An air cleaner which comprises a housing (1) with an air-supply pipe (2) forming an annular clearance (3). A main filtering member (5) is placed in the clearance (3) and in close vicinity to the opening (13) of the air-supply pipe (2) and additional filtering member (14). According to the invention the filtering member (14) has a recess (15) which is coaxial to the pipe (2) on the surface (16). The size of the recess (15) on the surface (16) is greater than the diameter of the pipe (2).

It is preferably to use the air cleaner in an engine operating in unfavorable conditions with vapors of oil and soot.

5 Claims, 5 Drawing Sheets

AIR CLEANER

TECHNICAL FIELD

The present invention relates to the engine manufacture and, more specifically, to automobile and tractor internal-combustion engines and, more particularly, to air cleaners.

BACKGROUND OF THE INVENTION

Known in the art is an air cleaner (V. E. Maev, N. N. Ponomarev. "Air-Cleaners for Automobile and Tractor Engines", 1971, "Machinostrojenie" Publishing House, (Moscow), p. 76–77) comprising a cylindrical housing positioned vertically, wherein en air-supply pipe is positioned coaxially therewith with the formation of an annular clearance between the outside surface of the tube and the inside surface of the housing. In the clearance there is provided a filtering member such as Kapron fibres placed into a rigid ring-shaped perforated cassette. The cassette height is less than the length of the air-supply pipe in the housing. In the direction of the air movement after the cassette an air-vent pipe is positioned which is directly connected to the inlet pipe of internal-combustion engines. The lower part of the housing which is its bottom is filled with an oil so that the outlet opening of the pipe is positioned above the level of the oil.

On the bottom of the housing coaxially with the pipe in the nulk of the oil a cup-like bath also filled with the oil is mounted. A jet of dusted air coming out of the air-supply pipe passes into the bath and displaces a layer of the oil therefrom by way of a dynamic head, and atomizes it. Drops of the atomized oil are intermixed with the air jet and wet the lower layers of the filtering member. The dusted air comes in contact with the oil which envelopes the dust particles and agglomerates them. Heavy particles of the dust with the excess of the oil get drained from the surface of the filtering member back into the lower part of the housing. The remaining dust particles with the air current penetrate into the lower oil-impregnated layers of the filtering member and get deposited on the fibres of the latter.

However, the dripping of the oil over the surface is non-uniform. In operation of an automobile or a tractor with such an air-cleaner under conditions of a rugged terrain there can take place inclinations of the air-cleaner which result in the situations where the oil excessively wets some regions of the filtering member and leaves other regions practically unwetted. The fibres of the filtering member only slightly wetted with the oil render a lower resistance to dust particle which, eventually, pass through the filtering member into the engine causing an early wear thereof. The excess of the oil from the abundantly wetted fibres also passsed into the engine with the dust, thus impairing its operation and causing wear too.

Also known is an air-clearer (FR, A 1536325) comprising a cylindrical housing, wherein substantially coaxially therewith an air-supply pipe is provided with the formation of a clearance between the outside surface of the tube and the inside surface of the housing and with a main filtering member positioned in said clearance. After the main filtering member along the direction of the air current an air-vent pipe is located communicating with the cavity of an internal-combustion engine and close to the lower end face of the housing on the side of the outlet opening of the pipe an additional filtering member is positioned. In the lower part of the housing between the end face and the additional filtering member oil is provided. The additional filtering member has a through opening coaxial with the air-supply pipe but with the size thereof considerably inferior to the air-supply pipe diameter.

In the engine operation a portion of the current of atmospheric air passing via the air-supply pipe penetrates into the through opening of the additional filtering member and, passing therethrough, contacts with the layer of an oil positioned under the additional filtering member in the lower part of the housing. The head of the dusted air is rather strong and pores of the additional filtering member constitute ½ of its volume, wherefore the oil drops pass through this filtering member and wet the air current passing right from the air-supply pipe into the main filtering member.

In such an air-cleaner upon the movement of a car or a tractor over a rugged terrain which is usual in their exploitation, the additional filtering member prevents an excessive spilling of the oil and reduces its ejection into the engine. However, a permanent change of the angle of inclination of the oil level to the air current outgoing from the pipe results in an insufficient and non-uniform spraying of the oil and, accordingly, a non-uniform wetting of the main filtering member, thus resulting in an increasing probability of penetration of dust particles into the engine, i.e. the efficiency of the air cleaning is lowered. Furthermore, at high angles of inclination or at a sharp change in the movement speed of a car or a tractor, running over some obstacles and the like, a portion of the oil is delivered through the additional filtering member into the main one, thus excessively saturating the latter with the oil which can be entrained, along with dust, and penetrates into the engine, which results in an invensive wear of the latter.

All these factors are detrimental to the dusting capacity of the air-cleaner which is determined by the amount of dust trapped by the filtering members. Besides, the presence of a considerable volume of the oil in the lower part of the housing entails a strictly vertical position of the air cleaner which is not always rational from the point of view of a compact arrangement thereof in the body of a car or a tractor.

SUMMARY OF THE INVENTION

The present invention is directed to the provision of an air-cleaner with such a design of the additional filtering member and its arrangement in the housing of the air cleaner which would make it possible to increase dust capacity of the filtering members while avoiding the necessity of pouring oil into the air cleaner, thus enabling eventually mounting the air cleaner at any angle to the horizontal.

The present invention resides in that in an air-cleaner comprising a housing with an air-supply pipe positioned inside said housing substantially coaxially therewith with the formation of a clearance between the outside surface of this pipe and the inside surface of said housing, wherein a main filtering member is located, with an air-vent pipe positioned after it in the direction of the air movement and close to the housing end face on the side of the outlet opening of the pipe and additional filtering member is provided, according to the present invention, in said additional filtering member a recess is made substantially coaxially with the pipe and facing the outlet opening of said pipe with its maximum size on the surface adjacent to the outlet opening of the pipe is greater than the diameter of the latter.

To improve the efficiency of dedusting of the air, it is advisable that the maximum size of the recess on the surface of the additional filtering member be within the range of from 1.10 to 2.45 of the pipe diameter and the recess depth be within the range of from 0.3 to 4.0 of the pipe diameter.

To still further improve the efficiency of air cleaning from dust, it is possible that the recess surface be made corrugated with alternating protrusions and depressions.

To simplify the process of manufacture of the air cleaner it is preferable that the height of the additional filtering member be such that its surface facing the pipe opening be contacting the surface of the main filtering member facing the recess.

To increase the dust capacity of the additional filtering member, a through duct should be preferably made therein.

The air cleaner according to the present invention, owing to the use of an additional filtering member with a recess substantially coaxial with the air-supply pipe makes it possible to improve the efficiency of dust cleaning of the air and to increase the dust capacity of the air cleaner and, hence, to extend the duration of its operation till an ultimate resistance value, since the majority of dust particles upon turning of the air current in the recess under the effect of centrifugal forces will deposit in said additional filtering member, thus reducing the amount of dust passing into the main filtering member.

Furthermore, the presence of the recess in said additional filtering member makes it possible to ensure such efficiency of dust cleaning of the air that the necessity of pouring an oil into the filtering member is avoided. This, in turn, enables a more compact mounting of the air cleaner in any position.

The design of the air cleaner according to the present invention makes it possible to considerably reduce the oil consumption.

BRIEF DESCRIPTION OF THE DRAWINGS

The present invention is further illustrated by the description of particular, but not limiting, embodiments thereof with reference to the accompanying drawings, wherein.

BEST MODE FOR CARRYING OUT OF THE INVENTION

Figure 1:
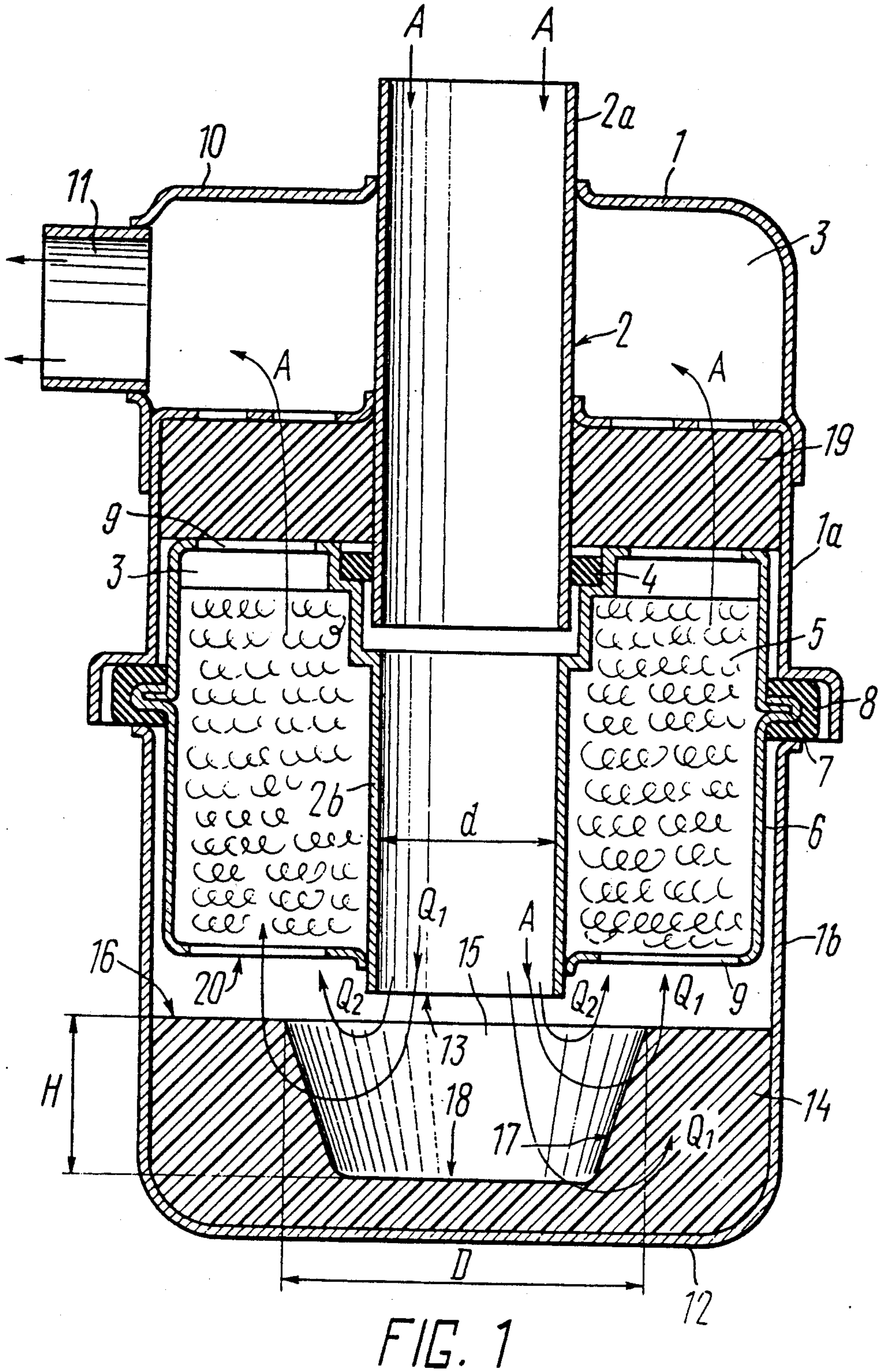
FIG. 1 is a general view of the air cleaner according to the present invention, in elevation.
Figure 2:
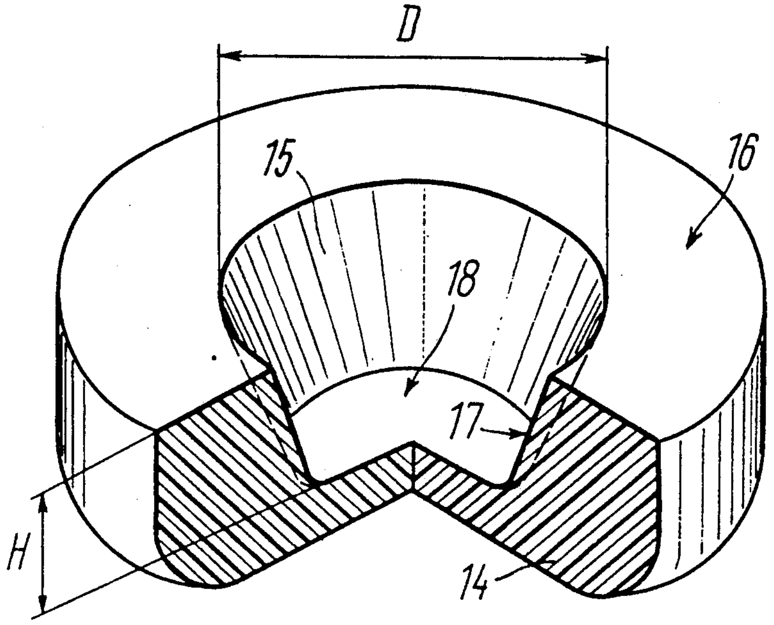
FIG. 2 is an isometric view of the additional filtering member.

The air cleaner shown in FIGS. 1 and 2 comprises a cylindrical housing 1 consisting of two detachable parts 1*a* and 1*b* and manufactured from a sheet steel. Positioned inside the housing 1 and substantially coaxially therewith is an air-supply pipe 2 with the formation of a clearance 3 between the outside surface of this pipe 2 and the inside surface of the housing 1. In the present embodiment of the air cleaner the pipe 2 consists of two detachable parts 2*a* and 2*b* the joint therebetween being sealed by means of a sealing annular gasket 4 made from a resilient material such as rubber. A main filtering member 5 of a fibrous structure (e.g. from Kapron fibres placed inside a cylindrical metallic cassette 6) is positioned in the clearance 3. The cassette 6 has an annular outside collar 7 onto which a V-like sealing ring is put. The collar 7 with the ring 8 is located between the detachable parts 1*a* and 1*b* of the housing 1 which are secured to one another by means of, e.g. spring clamps (not shown in the drawing).

At the end faces of the cassette 6 openings are made for passing air (along the arrow A) through the packing of the filtering member 5. After the filtering member 5 in the direction of the air movement (arrow A) close to the upper end face 10 of the housing 1 an air-vent pipe 11 is provided which communicates with the inlet pipe of an internal-combustion engine (not shown in the drawing). Close to the other end face 12 of the housing 1 on the side of the outlet opening 13 of the pipe 2 an additional filtering member 14 is located which is made of, for example, an elastic open-pore polyurethane foam.

A recess 15 is made in the additional filtering member 14 substantially coaxially with the pipe on the side facing the outlet opening 13 of the pipe 2. The maximum size of the recess 15 on the surface 16 of the additional filtering member 14 adjecent to the outlet opening 13 of the pipe 2 exceeds the diameter d of the latter and is equal to 1.10–2.45 of the diameter d of the pipe 2. In the case where the size D of the recess 15 on the surface 16 is more than 2.45 of the pipe diameter d, dust particles would substantially not reach the walls 17 of the recess 15. The dust settling efficiency in the additional filtering member 14 in this case will sharply drop, thus resulting in the penetration of dust into the main filtering member 5.

In the case where the size D of the recess 15 on the surface 16 of the additional filtering member 14 is less then 1.1 of the pipe 2 diameter d, due to an insufficient surface area of the recess 15 this surface will become rapidly clogged with dust, thus hindering penetration of the dust particles inside the additional filtering member 14. This will also result in an increased rate of penetration of dust into the main filtering member 5.

In the present embodiment the size D of the recess 15 on the surface 16 is equal to two diameters of the pipe 2, i.e. D=2d.

The depth D of the recess 15 is varied within the range of from 0.3 to 4.0 diameter d of the pipe 2.

In the case where the depth H is above 4.0 diameters d of the pipe 2, this results in a considerable increase of the overall dimensions of the air cleaner and the dust particles will not reach, the bottom 18 of the recess 15.

In the case where the depth H of the recess 15 is less than 0.3 diameter d of the pipe 2, the total area of the surface of the recess 15 is insufficient.

In the instant embodiment the depth H of the recess 15 is equal to the diameter d of the pipe 2, i.e. H=d.

In the clearance 3 between the main filtering member 5 and the air-vent pipe 11 one more filtering member 19 having a ring-like shape is positioned. The density of this member 19 is, as a rule, higher than that of the filtering members 5 and 14.

The recess 15 of the additional filtering member 14 shown in FIG. 2 is made as a tapered cone expanding to the surface 16 and having inclined walls 17. However, the shape of the recess 15 can be different, for example cup-like, cylindrical, more sophisticated, and the like.

Figure 3:
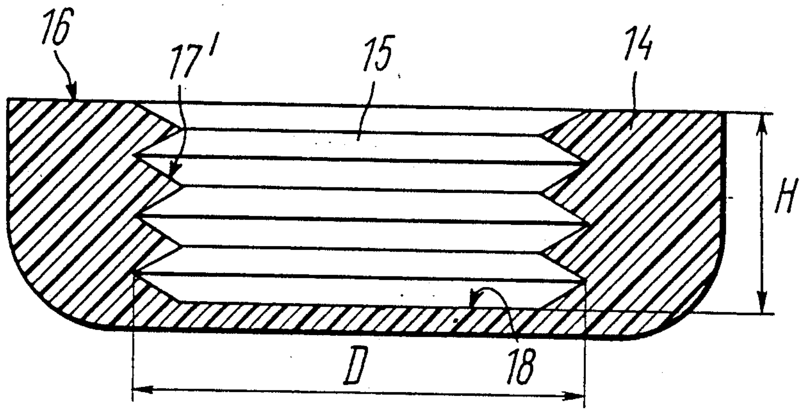
FIG. 3 is an embodiment of the additional filtering member shown in FIG. 2, elevation view.

In the embodiment of the additional filtering member 14 shown in FIG. 3 of the accompanying drawing, the wall 17' of the recess 15 is made corrugated with alternation of protrusions and depressions so that said protrusions and depressions are oriented parallel to the surface of the additional filtering member 14.

Figure 4:
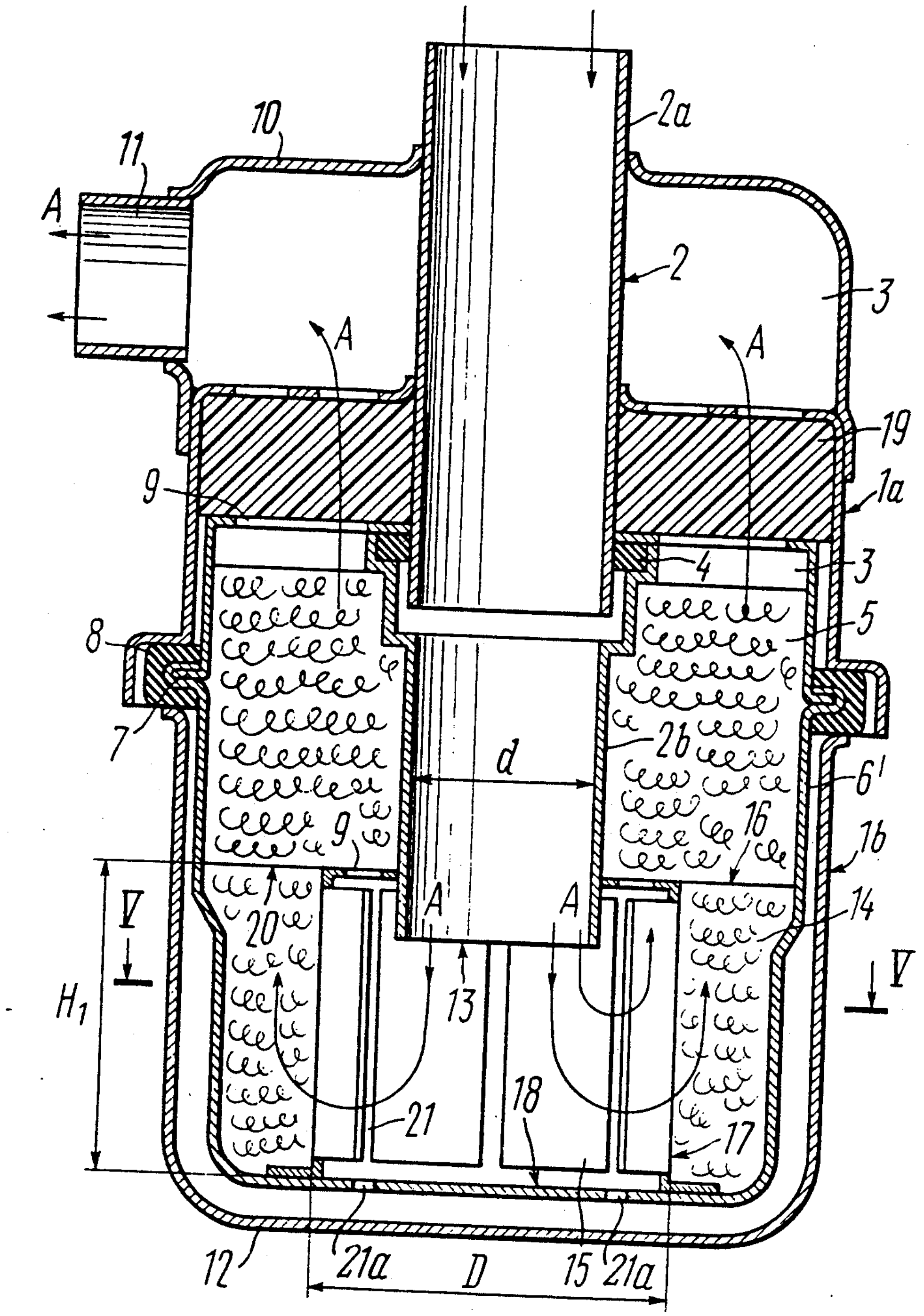
FIG. 4 is an embodiment of the air cleaner according to the present invention, elevation view.
Figure 5:
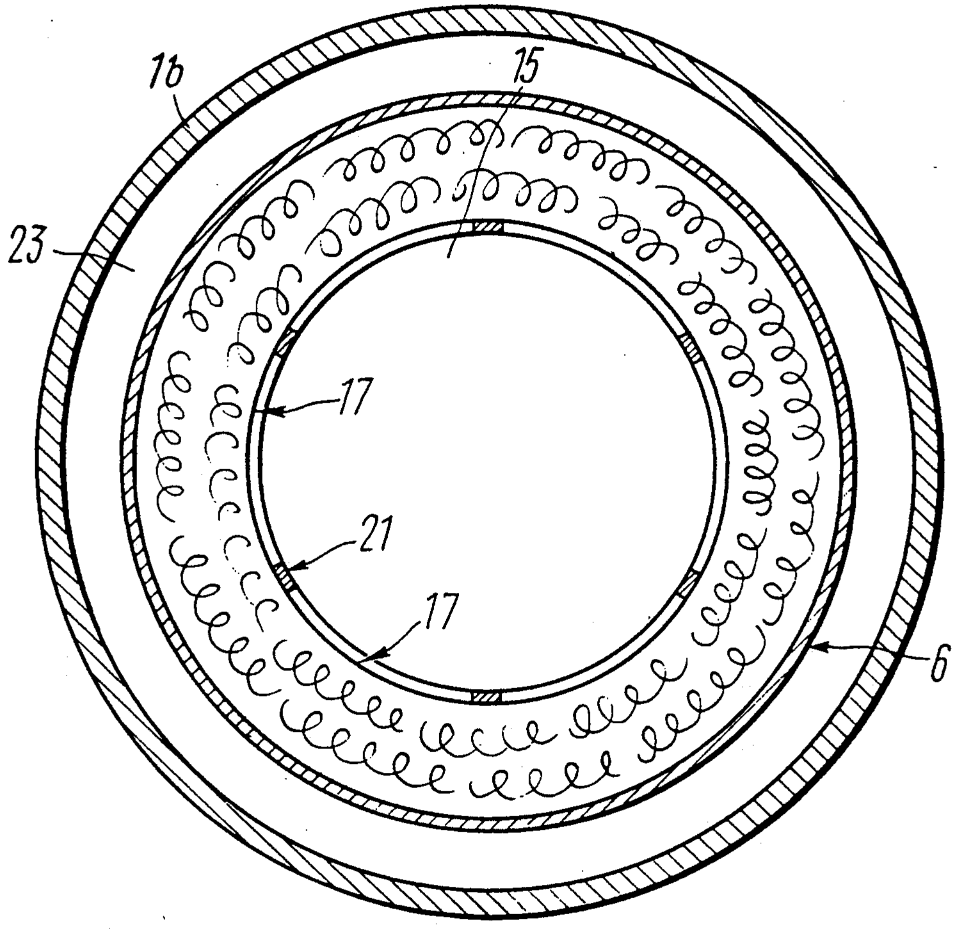
FIG. 5 is a cross-section V—V in FIG. 4.

The embodiment of the air cleaner shown in FIGS. 4 and 5 differs from the air cleaner shown in FIGS. 1 and 2 in that the main and additional filtering members 5 and 14 respectively are made as a whole, i.e. that the height $H_1$ of the additional filtering member 14 is such that its surface 16 facing the opening 13 of the pipe 2 contacts the surface 20 of the main filtering member 5 facing the recess 15. In this case both filtering members 5 and 14 are placed into a common metallic cassette 6 provided with an insert 21 of a reticulated structure to prevent falling-out of Kapron fibres into the cavity of the recess 15. The bottom 18 of the recess 15 provided with openings 21"*a*".

Figure 6:
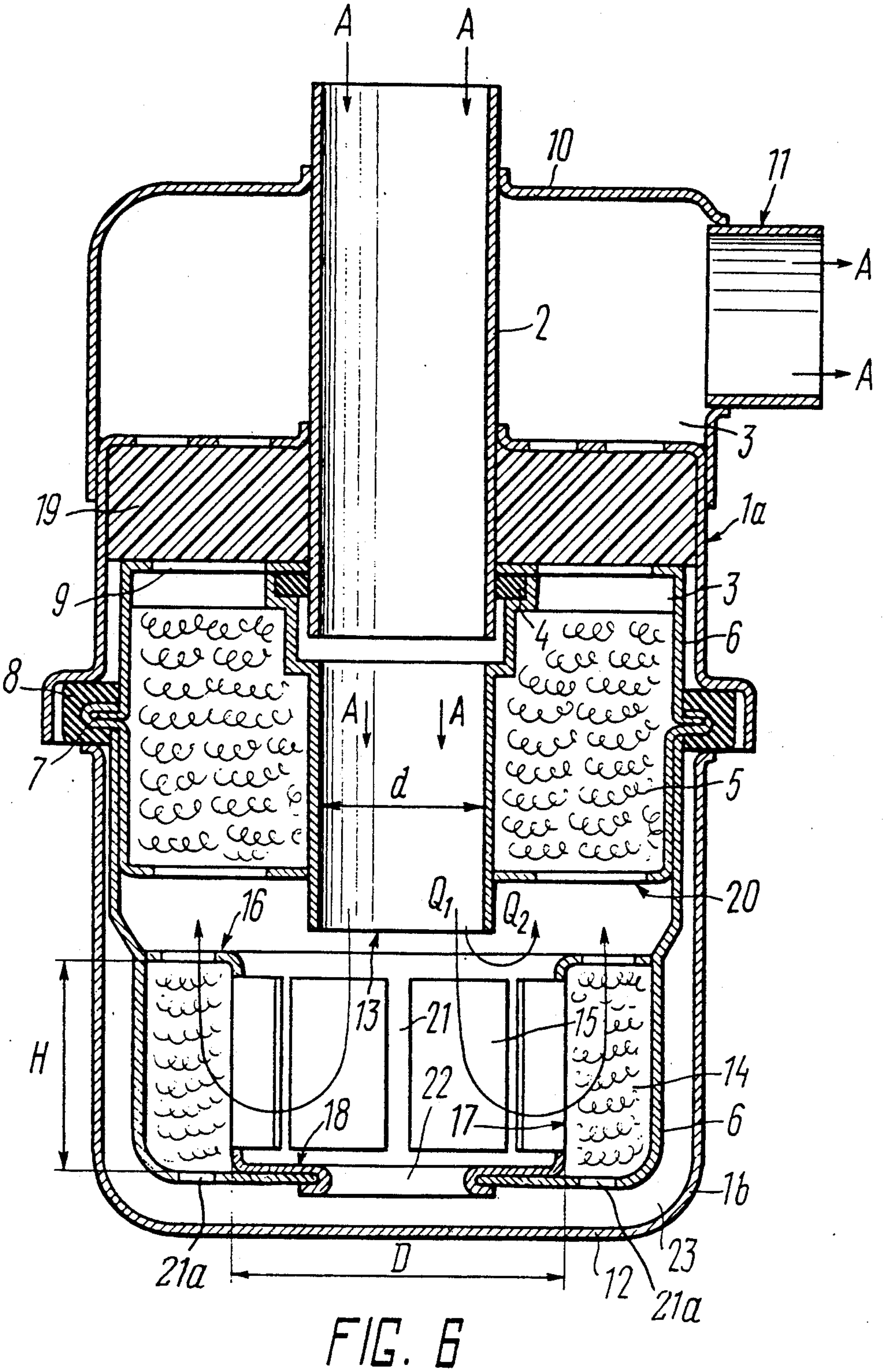
FIG. 6 is still another embodiment of the air cleaner according to the present invention, elevation view.

In the air cleaner embodiment shown in FIG. 6 of the accompanying drawing an outlet duct 22 is made in the additional filtering member 14 at the centre of the bottom of the recess 15 which duct communicates the space occupied by the recess 15 with the space 23 between the inside wall of the housing 1 and the surface of the additional filtering member 14.

Described hereinbefore have been the preferred embodiments of the present invention intended for illustration thereof, but it is clear for a person skilled in the art that various modifications could be made therein without, however, falling beyond the scope of the appended claims.

The embodiment of the air cleaner shown in FIGS. 1 and 2 operates in the following manner. A car or tractor engine (not shown) is energized. A stream of dusted atmospheric air (arrow A) due to a reduced pressure in the cylinders of the internal-combustion engine communicating with the atmosphere through the air cleaner is sucked into the air-supply pipe 2 located inside the housing 1. At the outlet from the opening 13 of the pipe 2 the air stream passes into the recess 15 of the additional filtering member 14 and turns in the opposite direction. In this case a portion $Q_1$ of the air stream penetrates into the additional filtering member 14 through the air-permeable wall 17 of the recess 15 and, turning therein, comes out through its surface 16. The dust particles of the portion $Q_1$ of the stream pass together with the air inside the filtering member 14. In doing so, the dust particles are deposited at the account of both usual filtration and due to the deviation of the particles from the line of current under the effect of centrifugal forces towards the zones of the member 14 adjacent to the housing 1.

Another portion $Q_2$ of the air stream contacting the inside walls of the pipe 2 follows the path of the least resistance—into the clearance between the outlet opening 13 of the pipe 2 and the recess 15 of the additional filtering member 14. The dust particles of the portion $Q_2$ from the air stream, while deviating from its path under the effect of centrifugal forces, pass onto the surface of the walls 17 of the recess 15. To improve deposition of dust particles, the additional filtering member 14 is wetted with an oil during its assembling.

To intensify the dust deposition from the portion $Q_2$ of the air stream, the surface of the wall 17 (FIG. 3) of the recess 15 is made corrugated with alternating protrusions and depressions.

The dust particles non-trapped by the filtering member 14 (FIGS. 1 and 2) pass towards the surface 20 of the main filtering member 5. All the dust particles remaining in the portions $Q_1$ and $Q_2$ of the air stream are substantially deposited on the fibres of this filtering member 5, but in the case of tearing-off of the aggregated particles a filtering member 19 preliminarily impregnated with an oil is provided in their path.

Therefore, upon penetration of the air stream into the air-vent pipe 11, said stream becomes substantially fully exempted from dust.

The air cleaner shown in FIGS. 4 and 5 operates in a manner similar to that described for the embodiment thereof shown in FIGS. 1 and 2, with the only difference that filtration therein occurs mainly according to the mechanism described for the stream $Q_1$. It is advisable that the filtering member 14 be preliminarily wetted with an oil, surplus of which runs down through the openings 21"*a*".

The operation of the air-cleaner shown in FIG. 6 of the accompanying drawing differs from that of the air-cleaner shown in FIGS. 1, 2, 4 and 5 in that the heaviest dust particles upon turning in the recess 15 penetrate, under the effect of centrifugal forces, into the space 23 limited by the inside wall of the end face of the housing 1 and by the surface of the additional filtering member 14.

All the above-described embodiments of the air cleaner according to the present invention operate in much the same manner when inclined at any angle to the horizontal.

The air cleaner according to the present invention and the prior art air cleaner have been subjected to stand tests.

The dimensions and the structure arrangement of the main filtering member 5, of the additional filtering member 14 and 19 in both test embodiments of the air cleaner were the same. In the additional filtering member 14 of the air cleaner according to the present invention a cylindrical recess was made with the diameter of 1.1 to 2.45 of the pipe diameter and the depth was within the range of 0.3 to 4.0 diameters of the pipe.

The tests have been carried out on a motor-free stand for testing air cleaners with the use of an air stream containing particles of quartz dust with the specific surface area of 5.600 $cm^2/g$ at the air stream speed of movement through the member 5 equal to 2.2 m/s. The dust content in the air was 0.4 $g/m^3$.

The tests have shown that the dust capacity (the amount of dust trapped) of the air cleaner was by 2.2 times higher and the mean factor of dust passage equal to the ratio of the amount of the passed dust to the dust amount passed into the air-supply pipe is by 2 times lower.

INDUSTRIAL APPLICABILITY

The use of the air cleaner according to the present invention is possible in carburettor or diesel internal-combustion engines, as well as in other systems of filtration of air and gases.

It is preferable to use the air cleaner for replacing dry-type air cleaners with cardboard filtering members and for air-cleaners with an oil bath, both operating under unfavourable conditions—with vapours of an oil and with carbon black contained in the air.

What we claim is:

1. An air cleaner comprising a housing (1) with an air-supply pipe (2) positioned substantially coaxially thereto with the formation of a clearance (3) between the outside surface of this pipe (2) and the inside surface of the housing (1) with the main filtering member (5) placed in the clearance (3), an air-vent pipe (11) positioned after the main filtering member (5) in the direction of the air movement, an additional filtering member (14) located close to the end face (12) of the housing (1) on the side of the outlet opening (13) of the pipe (2), characterized in that a recess (15) is made substantially coaxially to the pipe (2) on the side facing the outlet opening (13) of the pipe (2) with the maximum size (D) of the recess (15) on the surface (16) adjacent to the outlet opening (13) of the pipe (2) is greater than the diameter (d) of the latter.

2. An air cleaner according to claim 1, characterized in that the maximum size (D) of the recess (15) on the surface (16) of the additional filtering member (14) is equal to 1.10–2.45 of the pipe (2) diameter (d) and the depth of the recess (15) is equal to 0.3–4.0 diameter (d) of the pipe (2).

3. An air cleaner according to claim 1, characterized in that the surface of the recess (15) is made with alternating protrusions and depressions.

4. An air cleaner according to claim 1, characterized in that the height (H) of the additional filtering member (14) is such that its surface (16) facing the pipe (2) opening (13) contacts the surface (20) of the main filtering member (5) facing the recess (15).

5. An air cleaner according to claim 1, characterized in that a duct (22) is made in the additional filtering member (14).

* * * * *